Dec. 18, 1945.   H. O. KOCH   2,391,169
EGG DECAPPER
Filed March 25, 1944
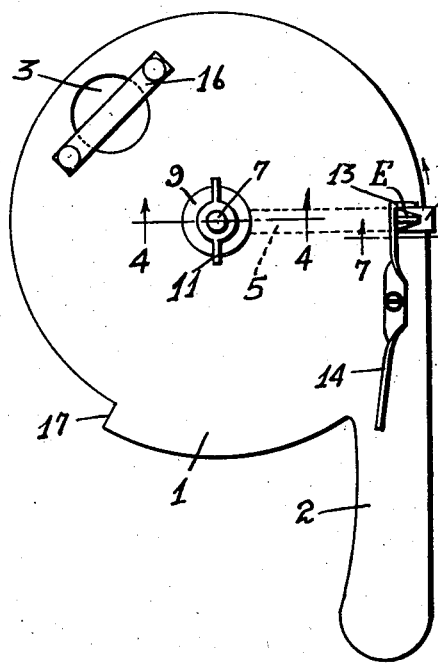
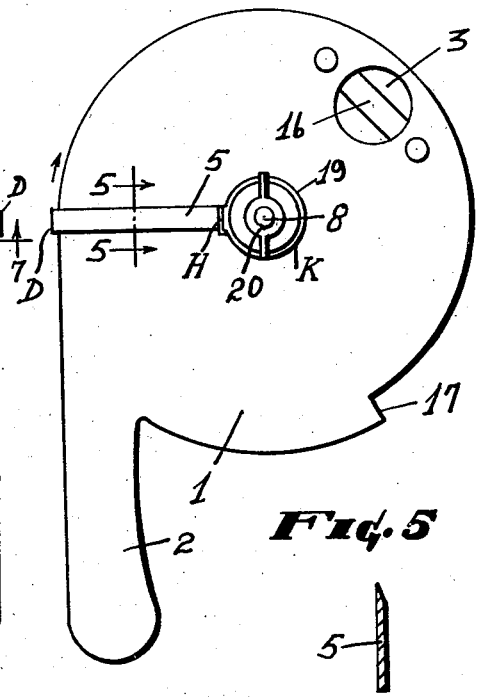
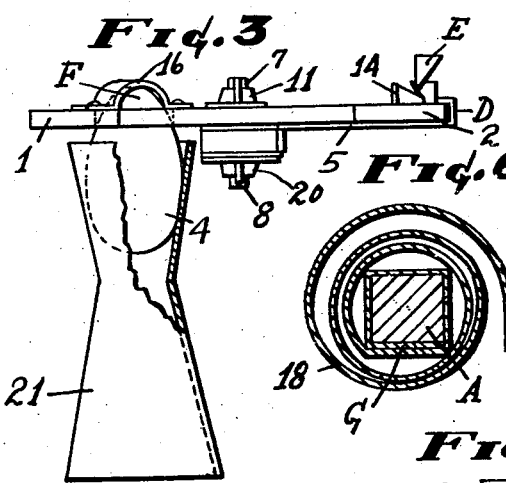
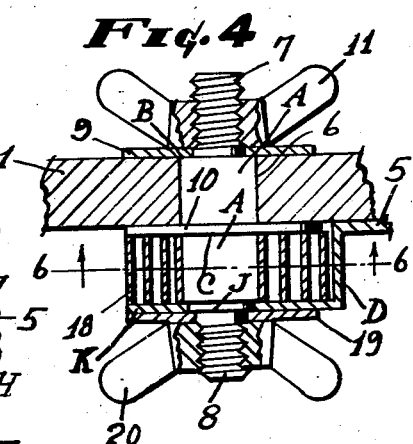
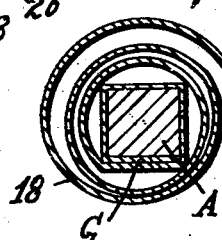
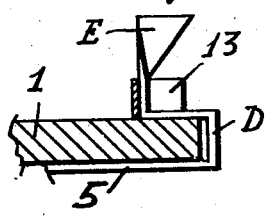
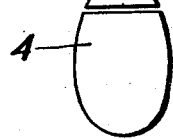
INVENTOR.
HARRY O. KOCH Patented Dec. 18, 1945

2,391,169

UNITED STATES PATENT OFFICE 2,391,169

EGG DECAPPER

Harry O. Koch, Wichita, Kans.

Application March 25, 1944, Serial No. 528,040

2 Claims. (Cl. 146—2)

This invention relates to an egg decapper and has for its principal object to sever the shell of an egg adjacent one end thereof as accessible means to its contents.

A further object of this invention is to provide a tool and means to support an egg vertically in working relation to the tool so that one end of a soft-boiled egg may be severed a short distance inward without splashing its contents or excessively shredding the shell.

A still further object of this invention is to arrange the supporting means in such a way as to retain the egg upright and without danger of burning the hand while the egg is hot; furthermore, to remove and consume its contents by use of a spoon or the like, the said means is reversible as a container for large or small eggs.

These and other objects will hereinafter be more fully explained, reference being had to the drawing forming a part of this specification, and in which like characters will apply to like parts in the different views.

Referring to the drawing:

Fig. 1 is a plan view of the upper side of the tool, while Fig. 2 is a plan view of the under side thereof.

Fig. 3 is an elevation of the tool in working relation to an egg support and egg positioned therein, said support being partly in section.

Fig. 4 is an enlarged sectional view of the hub structure and disc taken on line 4—4 in Fig. 1.

Fig. 5 is an enlarged cross section through the blade taken on line 5—5 in Fig. 2.

Fig. 6 is an enlarged sectional view through the hub, taken on line 6—6 in Fig. 4.

Fig. 7 is a sectional view taken on line 7—7 in Fig. 1.

Fig. 8 is an elevation of an egg to show where the same is severed by the tool.

The invention herein disclosed consists of a disc-like structure 1 having a handle 2 extending from the edge thereof, said disc having therethrough an opening 3 spaced a short distance inward from the edge through which one end of an egg 4 will extend preparatory to severing the same adjacent one end by a stroke of a cutting blade 5 that is rockably connected at the center of said disc and removably connected to a hub that has a square portion A with respect to cross section to engage in a rectangular opening 6 extending through said disc near its axial center to avoid turning of the hub, and the said hub having threaded studs 7 and 8 axially extending from their respective ends of the square portions of the hub. Being so positioned, shoulders B and C are formed against which washers 9 and 10 will engage and between which the body of the disc will be firmly clamped by a wing nut 11 threadedly engaging on stud 7 at the upper side of the disc, it being understood that washer 10 has a rectangular opening to engage on the square hub beneath the disc and being secured by welding and spaced from washer 9 a lesser distance than the thickness of said disc body for tight engagement when said wing nut 11 is tightened.

Rockably connected at the lower extremity of said square portion of the hub is a blade having an offset D to permit the blade to slide freely on the under side of the disc, the blade thus positioned extending outward and around the peripheral edge of the disc and inward a short distance to form a U-shaped bend and from thence outward from the upward face of the disc to form a lip E to rock the blade to a set position as shown in Figs. 1, 2, and 3, and being so retained by a catch 13 having an arm 14 pivotally secured to the disc whereby the catch is tripped by rocking the lever outward, at which instant the blade will retract to sever the tip F of the egg positioned in an aperture passing through the disc and over which a guard 16 is arced to avoid throwing the egg tip when severed, and the said blade being stopped by a detent 17 formed by an outward extension at the peripheral edge of the disc as shown in Figs. 1 and 2, said blade movement when tripped being actuated by a coil spring 18 that is secured to the square portion of the hub by snugly bending therearound as at G and from thence the convolutions of the spring are wound as shown in Figs. 4 and 6, the free end of which has a hook H formed to engage at the offset of the blade to throw the blade, the said spring being wound by a clockwise movement of the blade.

To retain the said spring in its working position, it will be seen that the threaded stud 8 is shouldered as at J to secure a washer 19 fitting closely thereon and to space the washer outward from the apertured end K of the blade to permit free movement of the blade, the said washer being secured by a wing nut 20.

To remove the disc from the hub, wing nut 11 is removed and the hub withdrawn from the disc, and to displace the spring, wing nut 20 is removed. Being so assembled and disassembled is means to cleanse the components of the hub and elements carried thereby.

In Fig. 3 is shown an egg support 21 consisting of a structure made from fibrous material as a heat nonconductor, said structure being hollow and funneled inward from near its center outward toward each end as a container for eggs varying in size and vertically supported thereby, the open ends being the base when an egg is placed in one or the other of said ends. Furthermore the said structure will function as a holder for the egg while being consumed from the open end, and such modifications may be made as lie within the scope of the appended claims.

Having fully described my invention what I claim as new and desire to secure by Letters Patent is:

1. In an egg decapper, a circular disc having a handle tangentially extending a stationarily support the circular disc, said disc being apertured inward from its periphery to receive a tip of an egg extending therethrough and a guard arced across the aperture and being secured to the disc to retain the tip of the egg when severed, a shoulder outwardly extending radially from the periphery of the disc to function as a detent, the disc having a hub extending through an aperture at the axis of the disc, said hub having a leaf spring to wind thereon, a cutting blade having one end trunnioned on the hub and a shoulder in spaced relation from the hub and to which the free end of the leaf spring is attached as tensioning means for the blade, a return bend formed on the other end of the cutting blade to straddle the disc as it circumscribes the peripheral edge of the disc as cutting means for the egg, the return bend being to retain said cutting blade in sliding contact on the disc and to contact the shoulder as a stop therefor.

2. In an egg decapper, as recited in claim 1, a lip formed on the return bend of the cutting blade, an arm pivotally connected at its longitudinal center on the circular disc, one end of the arm having a catch formed thereon to engage the lip, the other end as rocking means to disengage the catch for rotatable motion of the cutting blade.

HARRY O. KOCH.